(12) United States Patent
Fukuda et al.

(10) Patent No.: US 11,959,430 B2
(45) Date of Patent: Apr. 16, 2024

(54) VEHICLE CONTROLLER AND VEHICLE CONTROL METHOD

(71) Applicant: TOYOTA JIDOSHA KABUSHIKI KAISHA, Aichi-ken (JP)

(72) Inventors: Atsushi Fukuda, Nisshin (JP); Eiichiroh Kido, Okazaki (JP); Masanao Idogawa, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/167,887

(22) Filed: Feb. 13, 2023

(65) Prior Publication Data
US 2023/0258141 A1    Aug. 17, 2023

(30) Foreign Application Priority Data
Feb. 16, 2022    (JP) ................................ 2022-022071

(51) Int. Cl.
| | | |
|---|---|---|
| *F02D 41/06* | (2006.01) | |
| *F02D 41/04* | (2006.01) | |
| *F02D 41/34* | (2006.01) | |
| *F02D 41/40* | (2006.01) | |
| *F02D 41/38* | (2006.01) | |

(52) U.S. Cl.
CPC ......... *F02D 41/065* (2013.01); *F02D 41/042* (2013.01); *F02D 41/345* (2013.01); *F02D 41/401* (2013.01); *F02D 2041/389* (2013.01)

(58) Field of Classification Search
CPC .. F02D 2009/0245; F02D 13/06; F02D 17/02; F02D 41/0087; F02D 41/123
See application file for complete search history.

(56) References Cited

U.S. PATENT DOCUMENTS

2009/0271095 A1* 10/2009 Kojima ............... F02N 11/0814
                                                              701/113
2011/0053735 A1*  3/2011 Lewis ................... F02D 41/126
                                                               477/99
2011/0054765 A1*  3/2011 Lewis ....................... F02N 5/04
                                                              701/112

FOREIGN PATENT DOCUMENTS

JP          2016136015 A    7/2016

* cited by examiner

*Primary Examiner* — Sizo B Vilakazi
(74) *Attorney, Agent, or Firm* — HAUPTMAN HAM, LLP

(57) ABSTRACT

A vehicle controller includes processing circuitry. The processing circuitry is configured to perform an intermittent stop of an engine in accordance with a traveling state of a vehicle, cause the engine to restart by self-sustaining resumption when restart of the engine is requested in a state in which the engine is rotating during the intermittent stop, and perform a retarded injection control that retards, in a combustion cycle of the engine, a starting time of a first fuel injection at the time of the restart of the engine by the self-sustaining resumption as compared to a starting time of a second fuel injection.

5 Claims, 2 Drawing Sheets

VEHICLE CONTROLLER AND VEHICLE CONTROL METHOD

BACKGROUND

1. Field

The present disclosure relates to a vehicle controller and a vehicle control method that perform an intermittent stop of an engine.

2. Description of Related Art

Japanese Laid-Open Patent Publication No. 2016-136015 discloses a configuration in which, when restart of an engine from an intermittent stop is requested in a state in which an engine rotation speed is higher than or equal to a certain value, the engine is caused to start by its own without assistance of external force.

If the beginning of the engine start-up is delayed at the time of resumption from an intermittent stop, the engine rotation speed drops before the engine is started. As a result, the engine may be unable to start by its own, or the vehicle may be re-accelerated sluggishly after the engine is started.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle controller includes processing circuitry. The processing circuitry is configured to perform an intermittent stop of an engine in accordance with a traveling state of a vehicle, cause the engine to restart by self-sustaining resumption when restart of the engine is requested in a state in which the engine is rotating during the intermittent stop, and perform a retarded injection control that retards, in a combustion cycle of the engine, a starting time of a first fuel injection at the time of the restart of the engine by the self-sustaining resumption as compared to a starting time of a second fuel injection.

In another general aspect, a vehicle control method includes performing an intermittent stop of an engine in accordance with a traveling state of a vehicle, causing the engine to restart by self-sustaining resumption when restart of the engine is requested in a state in which the engine is rotating during the intermittent stop, and retarding, in a combustion cycle of the engine, a starting time of a first fuel injection at the time of the restart of the engine by the self-sustaining resumption as compared to a starting time of a second fuel injection.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
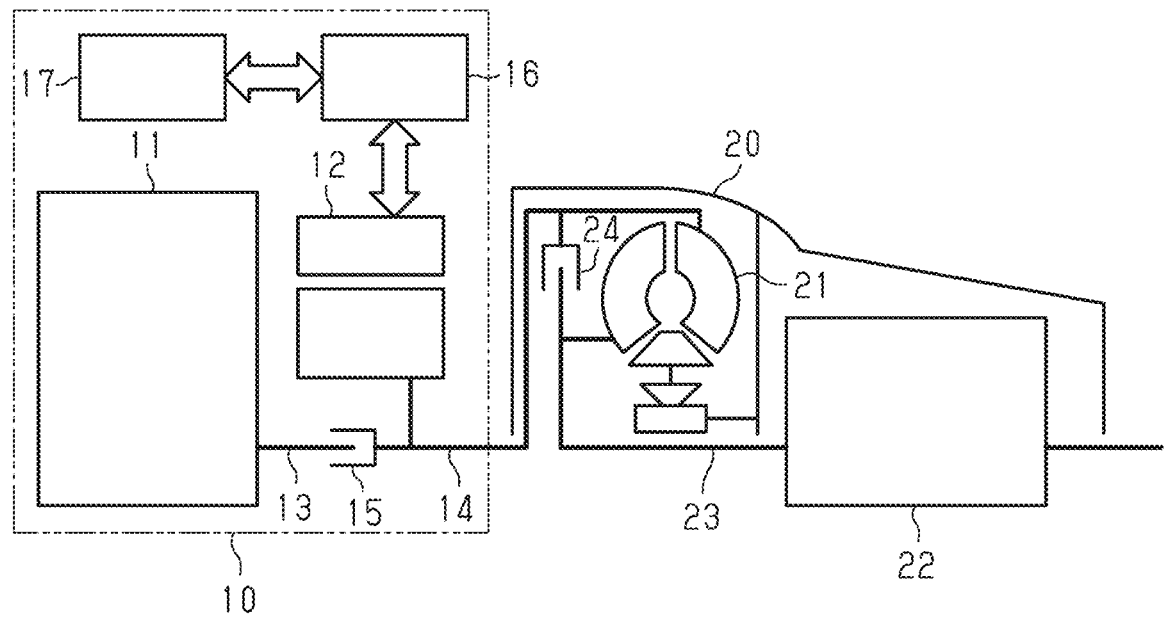
FIG. 1 is a diagram schematically showing a configuration of a drive system of a hybrid electric vehicle equipped with a vehicle controller according to one embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle controller according to one embodiment will be described with reference to FIGS. 1 to 3.

<Configuration of Drive System of Hybrid Electric Vehicle>

A configuration of a drive system of a hybrid electric vehicle controlled by the vehicle controller according to the present embodiment will be described with reference to FIG. 1. The hybrid electric vehicle includes a hybrid system 10 as a drive source. The hybrid system 10 includes an engine 11, a motor generator 12, and a system clutch 15. As shown in FIG. 2, the engine 11 includes cylinders each provided with two fuel injection valves. The two fuel injection valves are a port injection valve 40A, which injects fuel into an intake port, and a direct injection valve 40B, which injects fuel into the cylinder. The hybrid system 10 is configured to extract drive force from a rotary shaft of the motor generator 12. The system clutch 15 is disposed between a crankshaft 13, which is an output shaft of the engine 11, and a system output shaft 14. The system clutch 15 selectively connects and disconnects the crankshaft 13 and the system output shaft 14. The hybrid system 10 includes an inverter 16 and a battery 17. The inverter 16 controls the amount of electric power transferred between the motor generators 12 and the battery 17.

The hybrid electric vehicle includes a transmission 20. The transmission 20 includes a torque converter 21 and a gearbox 22. The system output shaft 14 of the hybrid system 10 is connected to a gearbox input shaft 23, which is an input shaft of the gearbox 22, with a torque converter 21. The gearbox 22 changes the speed of rotation of the gearbox input shaft 23 and transmits the rotation to wheels of the hybrid electric vehicle. The transmission 20 is provided with a lock-up clutch 24 capable of directly connecting the system output shaft 14 and the gearbox input shaft 23 without using the torque converter 21.

<Configuration of Vehicle Controller>

Next, the configuration of the vehicle controller according to the present embodiment will be described with reference to FIG. 2. The vehicle controller includes an electronic control unit 30. The electronic control unit 30 includes a processor 31 and a memory device 32. The processor 31 executes various processes related to control of the vehicle. The memory device 32 stores programs and data for the control of the vehicle.

The electronic control unit 30 receives detection signals of various sensors provided in various portions of the hybrid electric vehicle. The sensors include an air flow meter 33, a coolant temperature sensor 34, an intake pressure sensor 35, a crank angle sensor 36, an accelerator pedal sensor 37, and a vehicle speed sensor 38. The air flow meter 33 is a sensor that detects an intake air flow rate GA of the engine 11. The coolant temperature sensor 34 is a sensor that detects a coolant temperature THW of the engine 11. The intake pressure sensor 35 is a sensor that detects an intake pressure PM of the engine 11. The crank angle sensor 36 is a sensor that detects a crank angle CRNK, which is a rotational phase of the crankshaft 13 of the engine 11. The accelerator pedal sensor 37 is a sensor that detects an accelerator pedal operated amount ACC, which is an operated amount of the accelerator pedal of the hybrid electric vehicle by the driver. The vehicle speed sensor 38 is a sensor that detects a vehicle speed V of the hybrid electric vehicle. The electronic control unit 30 obtains an engine rotation speed NE, which is a rotation speed of the crankshaft 13 of the engine 11, from a detection result of the crank angle sensor 36.

The electronic control unit 30 controls the hybrid system 10 based on detection results of the sensors. For example, the electronic control unit 30 controls the operating state of the engine 11 by operating actuators of the engine 11, such as a throttle valve 39, the port injection valve 40A, the direct injection valve 40B, and an ignition device 41. The electronic control unit 30 controls torque of the motor generator 12 by controlling the inverter 16. The electronic control unit 30 also controls the system clutch 15. The opening degree of the throttle valve 39 will hereafter be referred to as a throttle opening degree TA.

The electronic control unit 30 performs an intermittent stop of the engine 11 in accordance with the traveling condition of the hybrid electric vehicle. For example, the electronic control unit 30 performs an intermittent stop of the engine 11 when the hybrid electric vehicle is decelerating or in a stopped state. During an intermittent stop of the engine 11, the electronic control unit 30 disengages the system clutch 15 so that the engine 11 is disconnected from the drive system. The intermittent stop refers to a state in which combustion in the engine 11 is stopped by stopping fuel injection and ignition, but does not mean that rotation of the engine 11 is stopped. The engine 11 may rotate by inertia for a certain period of time after an intermittent stop.

When the accelerator pedal is depressed during an intermittent stop, the electronic control unit 30 restarts the engine 11. If the engine 11 is in a stopped state or the engine rotation speed NE is relatively low at restart of the engine 11, the electronic control unit 30 restarts the engine 11 after engaging the system clutch 15 to increase the engine rotation speed NE with the torque of the generator motor 12. If the engine rotation speed NE is relatively high, the electronic control unit 30 keeps the system clutch 15 disengaged and causes the engine 11 to restart on its own without using external force. In the following description, restart of the engine 11 on its own without depending on external force will be referred to as self-sustaining resumption.

When a certain period of time elapses after an intermittent stop, the rotation of the engine 11 is stopped, and thus the self-sustaining resumption can no longer be performed. Therefore, restart of the engine 11 by the self-sustaining resumption during an intermittent stop is performed when the driver depresses the accelerator pedal to request the restart of the engine 11 immediately after the electronic control unit 30 starts the intermittent stop in response to deceleration of the hybrid electric vehicle. In the following description, the self-sustaining resumption of the engine 11 in response to an acceleration operation by the driver will be referred to as a change of mind (COM) resumption.

Figure 2:
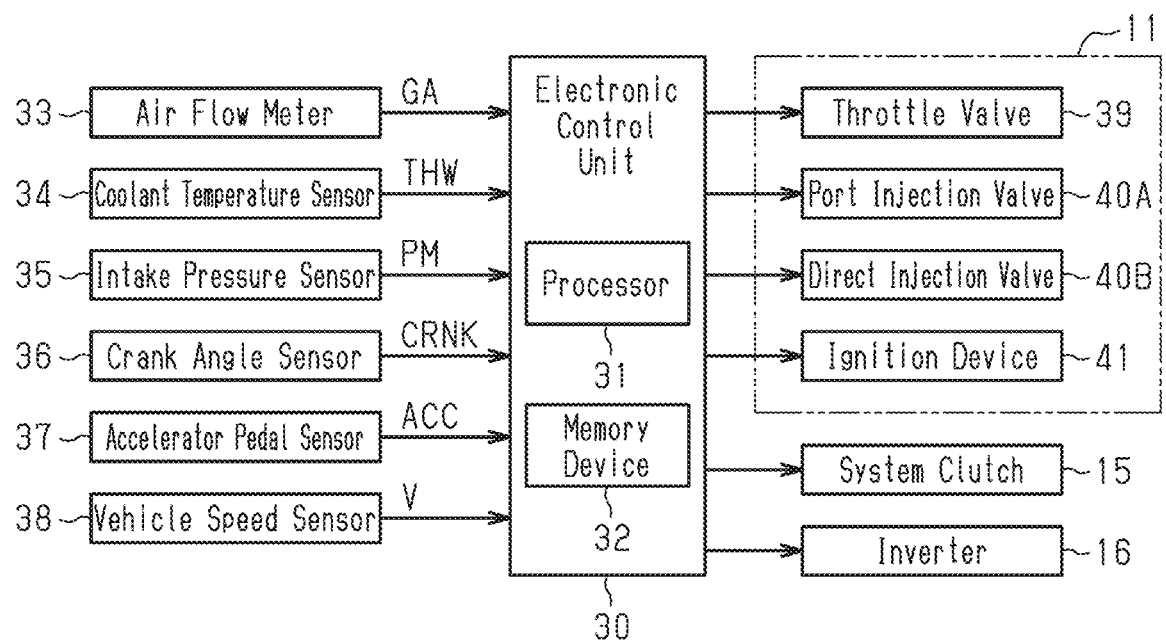
FIG. 2 is a schematic diagram showing a configuration of the vehicle controller mounted on the hybrid electric vehicle shown in FIG. 1.

In some cases, the hybrid electric vehicle shown in FIG. 1 executes a fuel cutoff process to stop fuel injection of the engine 11 while keeping the system clutch 15 engaged during deceleration. The fuel cutoff process is performed, for example, in order to supply fresh air to a particulate matter (PM) filter installed in the exhaust passage of the engine 11 to remove the PM deposited on the filter. When the engine rotation speed NE becomes lower than or equal to a specified resumption rotation speed or when the vehicle speed V becomes lower than or equal to a specified resumption vehicle speed during execution of the fuel cutoff process, the electronic control unit 30 interrupts the fuel cutoff process and restarts the engine 11. The restart of the engine 11 at this time is performed in a state in which the rotation of the engine 11 is assisted by the torque transmitted from the wheels through the system clutch 15. Therefore, restart of the engine 11 at the time of resumption during the fuel cutoff process does not correspond to the self-sustaining resumption, which does not depend on external force.

<Fuel Injection Control at COM Resumption>

The fuel injection control of the engine 11 at the time of the COM resumption will be described with reference to FIG. 3. FIG. 3 is a flowchart of a COM resumption fuel injection control executed by the electronic control unit 30 to perform a fuel injection control at the time of the COM resumption. The electronic control unit 30 determines the fuel injection amount and the starting time of fuel injection in the engine 11 through the process shown in FIG. 3 during a period from when the COM resumption is requested to when the combustion in the engine 11 is shifted to a stable complete combustion state.

Figure 3:
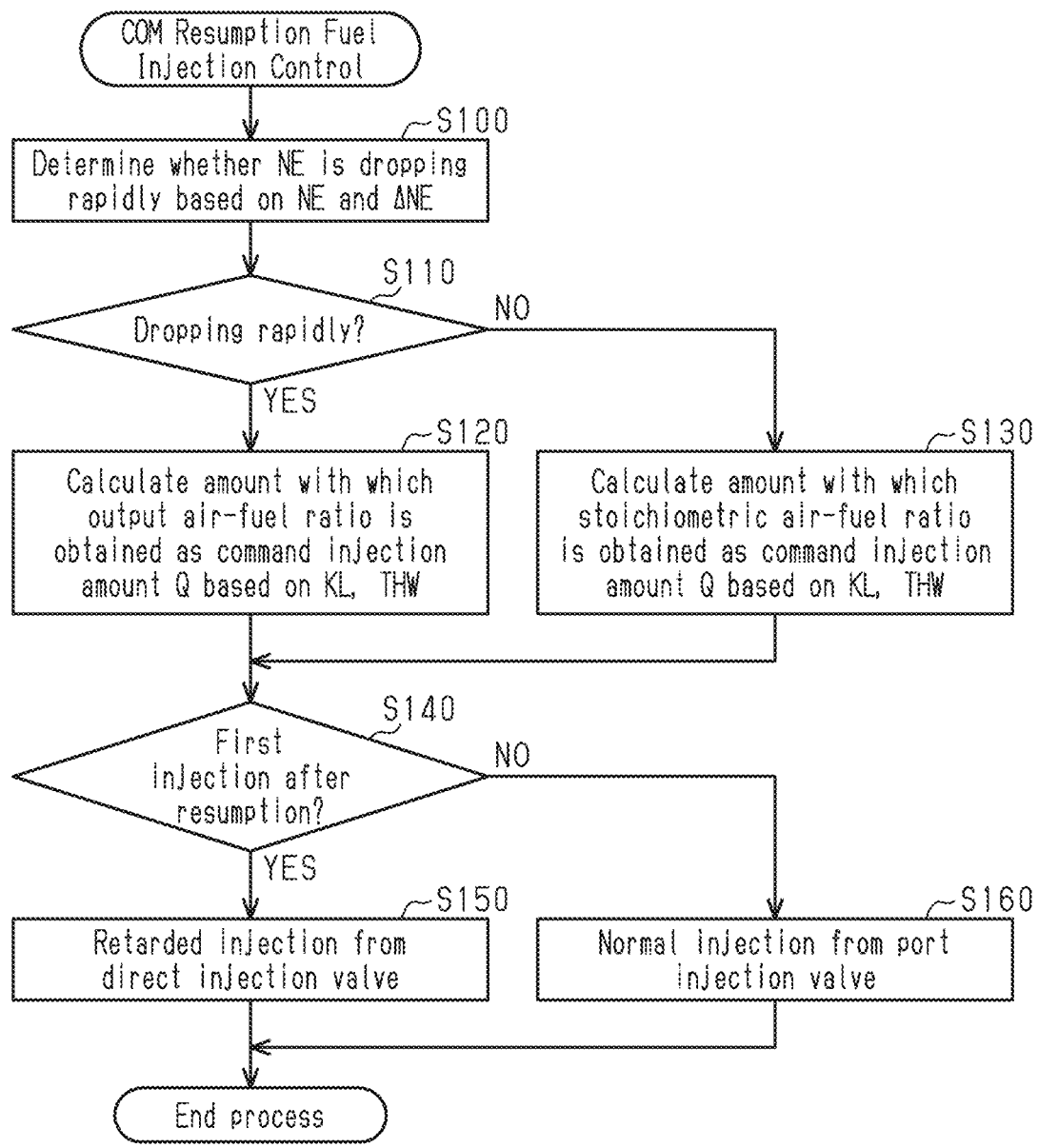
FIG. 3 is a flowchart of a COM resumption fuel injection control executed by the vehicle controller shown in FIG. 2.

When the process shown in FIG. 3 is started, the electronic control unit 30 first determines whether the engine rotation speed NE is dropping rapidly based on the engine rotation speed NE and an amount of change $\Delta NE$ of the engine rotation speed NE in step S100. When determining that the engine rotation speed NE is dropping rapidly (S110: YES), the electronic control unit 30 advances the process to step S120. In step S120, the electronic control unit 30 calculates, based on an engine load factor KL and the coolant temperature THW, an amount of fuel required to bring the air-fuel ratio of the air-fuel mixture burned in the cylinders to an output air-fuel ratio as a command injection amount Q, which is a command value of the fuel injection amount. The engine load factor KL represents the filling factor of intake air in the cylinders of the engine 11.

When determining that the engine rotation speed NE is not dropping rapidly (S110: NO), the electronic control unit 30 advances the process to step S130. In step S130, the electronic control unit 30 calculates, based on the engine load factor KL and the coolant temperature THW, an amount of fuel required to bring the air-fuel ratio of the air-fuel mixture burned in the cylinders to a stoichiometric air-fuel ratio as the command injection amount Q. The output air-fuel ratio is richer than the stoichiometric air-fuel ratio. Thus, the fuel injection amount of the engine 11 is increased during a rapid drop in the engine rotation speed NE. That is, the fuel injection amount of the engine 11 is more increased when the degree of drop in the engine rotation speed NE is relatively large than when the degree of drop is relatively small.

After calculating the command injection amount Q in step S120 or step S130, the electronic control unit 30 advances the process to step S140. In step S140, the electronic control unit 30 determines whether the fuel injection of the command injection amount Q, calculated in step S120 or step S130, is the first fuel injection in the current COM resumption. When the fuel injection of the command injection amount Q is the first fuel injection in the current COM resumption (S140: YES), the electronic control unit 30 commands the direct injection valve 40B to perform a retarded injection in step S150. At this time, the electronic control unit 30 sets the starting time of fuel injection to the most retarded time, in the combustion cycle of the engine 11, at which combustion is established when fuel injection of the command injection amount Q is performed by the direct injection valve 40B. In this case, the starting time of fuel injection is set to a certain time during the compression stroke. If the fuel injection of the calculated command injection amount Q is the second and subsequent fuel injections in the current COM resumption (S140: NO), the electronic control unit 30 commands the port injection valve 40A to perform normal injection in step S160. At this time, the electronic control unit 30 sets the starting time of fuel injection to the time, in the combustion cycle of the engine 11, at which the port injection valve 40A can inject fuel of the command injection amount Q. In this case, the starting time of fuel injection is set to a certain time during the intake stroke. In other words, the electronic control unit 30 sets the starting time of fuel injection to a time suitable for starting the engine 11 in this state. After commanding fuel injection in step S150 or step S160, the electronic control unit 30 ends the process of FIG. 3.

In the present embodiment, a resumption torque control is performed through the processes of steps S100 to S130 in FIG. 3. Further, in the present embodiment, a retarded injection control is performed through the processes of steps S140 to S160 in FIG. 3.

Operation and Advantages of Embodiment

Operation and advantages of the present embodiment will now be described.

If the beginning of the start-up of the engine 11 is delayed relative to the time when the COM resumption is requested, the engine rotation speed NE may drop before the engine 11 is started, making it difficult for the engine 11 to perform the self-sustaining resumption. Further, due to such a drop in the engine rotation speed NE, the acceleration of the hybrid electric vehicle after the COM resumption may be sluggish.

In this regard, the electronic control unit 30 of the vehicle controller according to the present embodiment performs the retarded injection control, which retards, in the combustion cycle of the engine 11, the starting time of the first fuel injection at the time of the COM resumption as compared to the starting time of the second and subsequent fuel injections. To be more specific, the electronic control unit 30 performs the first fuel injection from the direct injection valve 40B by the retarded injection so that the fuel injection is started at a certain time during the compression stroke. On the other hand, the electronic control unit 30 performs the second and subsequent fuel injections by the normal injection from the port injection valve 40A so that the fuel injection is started at a certain time during the intake stroke. In a case in which the first fuel injection at the time of the COM resumption is performed by the normal injection from the port injection valve 40A, the cylinder in which the earliest combustion can be performed is the cylinder in which the intake stroke occurs first after the restart request to the engine 11 is made. In a case in which the first fuel injection at the time of the COM resumption is performed by the retarded injection from the direct injection valve 40B, the cylinder in which the earliest combustion can be performed is the cylinder in which the compression stroke occurs first after the restart request to the engine 11 is made. Therefore, the combustion in the engine 11 is started at an earlier timing when the first fuel injection at the time of the COM resumption is performed by the retarded injection from the direct injection valve 40B than when the first fuel injection at the time of the COM resumption is performed by the normal injection from the port injection valve 40A. As a result, the time at which the engine torque is generated is advanced. This limits the drop in the engine rotation speed NE at the time of the COM resumption.

When the degree of drop in the engine rotation speed NE at the time of the self-sustaining resumption is not large, the electronic control unit 30 calculates the amount of fuel with which the stoichiometric air-fuel ratio is obtained as the value of the command injection amount Q. In contrast, when the degree of drop in the engine rotation speed NE at the time of the self-sustaining resumption is relatively large, the electronic control unit 30 calculates the amount of fuel with which the output air-fuel ratio is obtained as the value of the command injection amount Q. In this way, the electronic control unit 30 performs the resumption torque control, which causes the fuel injection amount of the engine 11 to be larger when the degree of drop in the engine rotation speed NE is relatively large at the time of restart of the engine 11 by the self-sustaining resumption than when the degree of drop is relatively small. Accordingly, when the degree of drop in the engine rotation speed NE is relatively large, the engine torque at the time of starting is increased, so that the drop in the engine rotation speed NE is limited.

The vehicle controller of the present embodiment has the following advantages.

(1) The electronic control unit 30 performs the retarded injection control, which retards, in the combustion cycle of the engine 11, the starting time of the first fuel injection at the time of the COM resumption as compared to the starting time of the second and subsequent fuel injections. This advances the combustion start of the engine 11 at the time of the COM resumption. That is, the time at which the engine 11 starts generating torque is advanced. The engine 11 is thus not prevented from starting by its own due to a drop in the engine rotation speed NE after a COM resumption request. Further, the acceleration of the hybrid electric vehicle after restart of the engine 11 is less likely to be sluggish.

(2) The electronic control unit 30 performs the first fuel injection in the COM resumption from the direct injection valve 40B, and performs the second and subsequent fuel injections from the port injection valve 40A. Fuel can be injected from the direct injection valve 40B even after the end of the intake stroke. Therefore, the starting time of the fuel injection in the combustion cycle of the engine 11 can be more retarded when the fuel injection is performed by the direct injection valve 40B than when the fuel injection is performed from the port injection valve 40A. On the other hand, under the condition at the time of the COM resumption, the combustion of fuel is more likely to be stabilized when fuel is injected from the port injection valve 40A than when fuel is injected from the direct injection valve 40B. Therefore, it is desirable that the first fuel injection be performed by the direct injection valve 40B, and the second and subsequent fuel injections be performed by the port injection valve 40A.

(3) The electronic control unit 30 performs the resumption torque control, which causes the fuel injection amount of the engine 11 to be larger when the degree of drop in the engine rotation speed NE is relatively large at the time of the COM resumption than when the degree of drop is relatively small. This prevents the engine rotation speed NE from dropping rapidly at the time of the COM resumption.

(4) When the degree of drop in the engine rotation speed NE is relatively small, the electronic control unit 30 sets the fuel injection amount at the time of the COM resumption to the amount of fuel with which the stoichiometric air-fuel ratio, which is an air-fuel ratio suitable for improving emissions, is obtained. In contrast, when the degree of drop in the engine rotation speed NE is relatively large, the electronic control unit 30 sets the fuel injection amount at the time of the COM resumption to the amount of fuel with which the output air-fuel ratio, which largely increases the engine torque, is obtained. Therefore, when the engine rotation speed NE is rapidly dropping at the time of the COM resumption, the engine torque is increased so as to limit the drop in the engine rotation speed NE. When the engine rotation speed NE is not rapidly dropping, the emissions of the engine 11 are improved.

The above-described embodiment may be modified as follows. The above-described embodiment and the following modifications can be combined as long as the combined modifications remain technically consistent with each other.

In the above-described embodiment, the COM resumption is performed by an acceleration operation by the driver. If a self-sustaining resumption of the engine 11 other than the COM resumption is performed, the electronic control unit 30 may also perform the retarded injection control and the resumption torque control in that self-sustaining resumption.

In the resumption torque control in the above-described embodiment, the electronic control unit 30 calculates the command injection amount Q based on the engine load factor KL and the coolant temperature THW. However, the electronic control unit 30 may calculate the command injection amount Q in a different manner.

In the resumption torque control in the above-described embodiment, the electronic control unit 30 sets the fuel injection amount to the amount of fuel with which the output air-fuel ratio is obtained when the degree of drop in the engine rotation speed NE is relatively large, and to the amount of fuel with which the stoichiometric air-fuel ratio is obtained when the degree of drop in the engine rotation speed NE is relatively small. If the fuel injection amount is set to be larger when the degree of drop in the engine rotation speed NE is relatively large than when the degree of drop in the engine rotation speed NE is relatively small, the electronic control unit 30 may perform the resumption torque control so as to set the fuel injection amount to an amount of fuel different from the those describe above.

The electronic control unit 30 may perform only the retarded injection control without performing the resumption torque control.

In the retarded injection control in the above-described embodiment, the electronic control unit 30 performs the first fuel injection from the direct injection valve 40B at the time of the COM resumption. If the starting time of fuel injection is retarded in the combustion cycle of the engine 11 as compared to those in the second and subsequent fuel injections at the time of the COM resumption, then the electronic control unit 30 may also perform the first fuel injection from the port injection valve 40A. If the starting time of fuel injection is advanced in the combustion cycle of the engine 11 as compared to those in the first fuel injection at the time of the COM resumption, then the electronic control unit 30 may also perform the second and subsequent fuel injections from the direct injection valve 40B. In these cases, the vehicle controller of the above-described embodiment can be used in a vehicle equipped with an engine 11 including only the port injection valve 40A or only the direct injection valve 40B.

The vehicle controller of the above-described embodiment can be used in a vehicle having a drive system with a configuration different from that shown in FIG. 1 as long as the vehicle satisfies the following requirements. That is, any vehicle may be used as long as the vehicle intermittently stops the engine in accordance with the traveling state of the vehicle and restarts the engine by self-sustaining resumption when the restart of the engine is requested in a state in which the engine is rotating during the intermittent stop.

The electronic control unit 30 is not limited to one that performs various processes according to programs. For example, the electronic control unit 30 may include a dedicated hardware circuit (for example, an application-specific integrated circuit (ASIC)) that executes at least part of the processes executed in the above-described embodiment. That is, the electronic control unit 30 may be processing circuitry that includes any one of the following configurations (a) to (c).

(a) Processing circuitry including a processor that executes all of the above-described processes according to programs and a program storage device such as a ROM that stores the programs.

(b) Processing circuitry including a processor and a program storage device that execute part of the above-described processes according to the programs and a dedicated hardware circuit that executes the remaining processes.

(c) Processing circuitry including a dedicated hardware circuit that executes all of the above-described processes.

Multiple software processing devices each including a processor and a program storage device and multiple dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller, comprising processing circuitry, wherein the processing circuitry is configured to
perform an intermittent stop of an engine in accordance with a traveling state of a vehicle, cause the engine to restart by self-sustaining resumption when restart of the engine is requested in a state in which the engine is rotating during the intermittent stop, and perform a retarded injection control that retards, in a combustion cycle of the engine, a starting time of a first fuel injection at the time of the restart of the engine by the self-sustaining resumption as compared to a starting time of a second fuel injection.

2. The vehicle controller according to claim 1, wherein the engine includes cylinders each equipped with two fuel injection valves, the fuel injection valves being a direct injection valve and a port injection valve, and the processing circuitry is configured to perform, in the retarded injection control, the first fuel injection from the direct injection valve and the second fuel injection from the port injection valve.

3. The vehicle controller according to claim 1, wherein the processing circuitry is configured to perform a resumption torque control that causes a fuel injection amount of the engine to be larger when a degree of drop in an engine rotation speed is relatively large at the time of the restart of the engine by the self-sustaining resumption than when the degree of drop is relatively small.

4. The vehicle controller according to claim 3, wherein the processing circuitry is configured to, during the resumption torque control, set the fuel injection amount such that, when the degree of drop in the engine rotation speed is relatively small, an air-fuel ratio of an air-fuel mixture burned in the engine becomes a stoichiometric air-fuel ratio, and set the fuel injection amount such that, when the degree of drop in the engine rotation speed is relatively large, the air-fuel ratio of the air-fuel mixture becomes an output air-fuel ratio, the output air-fuel ratio being richer than the stoichiometric air-fuel ratio.

5. A vehicle control method, comprising:

performing an intermittent stop of an engine in accordance with a traveling state of a vehicle;

causing the engine to restart by self-sustaining resumption when restart of the engine is requested in a state in which the engine is rotating during the intermittent stop; and retarding, in a combustion cycle of the engine, a starting time of a first fuel injection at the time of the restart of the engine by the self-sustaining resumption as compared to a starting time of a second fuel injection.

* * * * *